United States Patent [19]

Matsunuma et al.

[11] Patent Number: 5,409,738
[45] Date of Patent: Apr. 25, 1995

[54] RECORDING MEDIUM

[75] Inventors: Satoshi Matsunuma; Yuichi Kokaku; Makoto Kitoh, all of Yokohama; Shigehiko Fujimaki, Machida, all of Japan

[73] Assignee: Hitachi, Ltd., Tokyo, Japan

[21] Appl. No.: 216,287

[22] Filed: Mar. 23, 1994

Related U.S. Application Data

[62] Division of Ser. No. 795,485, Nov. 21, 1991, abandoned.

[30] Foreign Application Priority Data

Nov. 21, 1990 [JP] Japan .................. 2-314026

[51] Int. Cl.[6] ............................. B05D 5/12
[52] U.S. Cl. ...................... 427/502; 427/509; 427/553; 427/534; 427/130; 427/131
[58] Field of Search ............... 427/502, 508, 509, 490, 427/539, 553, 534, 130, 131

[56] References Cited

U.S. PATENT DOCUMENTS

| | | |
|---|---|---|
| 4,565,734 | 1/1986 | Arai et al. . |
| 4,696,845 | 9/1987 | Yanagisawa . |
| 4,705,699 | 11/1987 | Burguette et al. . |
| 4,840,843 | 6/1989 | Sano et al. .................. 427/131 |
| 4,900,622 | 2/1990 | Nakayama et al. . |
| 5,055,359 | 10/1991 | Tsuno et al. . |
| 5,061,562 | 10/1991 | Yamanaka et al. . |
| 5,080,971 | 1/1992 | Yokoyama et al. . |
| 5,104,709 | 4/1992 | Kokaku et al. . |
| 5,143,787 | 9/1992 | Frew et al. . |

OTHER PUBLICATIONS

Cas Registry File for Hexafluoropropene.

Primary Examiner—Michael Lusignan
Assistant Examiner—Erma Cameron
Attorney, Agent, or Firm—Antonelli, Terry, Stout & Kraus

[57] ABSTRACT

Disclosed are a recording medium comprising a substrate, a thin film for recording formed on at least one side of the substrate, a protective layer formed on the thin film, and a lubricative film formed on the protective layer, the lubricative film comprising an oxidative polymerization product having main molecular chains chemically bonded to the protective film; and a process for producing the recording medium. This recording medium is excellent in lubricity and durability, and the layers formed thereon can be very thin.

11 Claims, 1 Drawing Sheet

F I G. 1
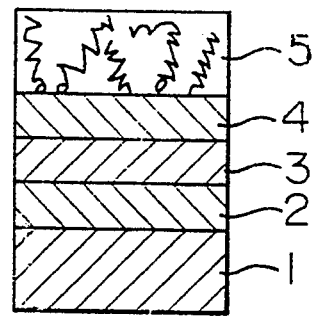
F I G. 2
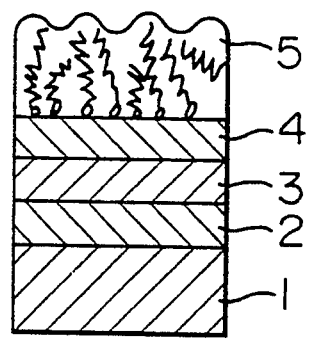
F I G. 3
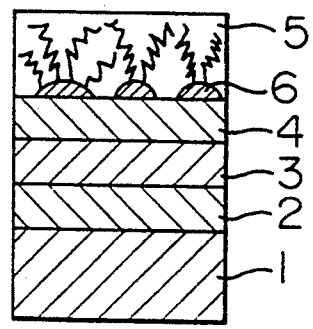

RECORDING MEDIUM

This application is a divisional application of application Ser. No. 795,485, filed Nov. 21, 1991 now abandoned.

BACKGROUND OF THE INVENTION

This invention relates to a recording medium, more particularly to a laminated structure of a protective film, lubricative layer, etc. which are applied on the surface of the recording media of the type which contacts the magnetic head temporarily or constantly, such as magnetic recording disk or tape.

For instance, in the magnetic recording disks (hereinafter referred to as magnetic disks) used as mass storage for electronic computers, a ferromagnetic thin film with high recording density is formed on the surface of a non-magnetic substrate by sputtering or other means. Generally, a protective film made of amorphous carbon is formed on said ferromagnetic film, and a perfluoropolyether type liquid lubricant is further applied on said protective film for enhancing sliding durability and corrosion resistance by dipping into lubricant solution.

Adhesiveness of the liquid lubricant to the protective film surface exerts a great influence on sliding durability and corrosion resistance of the magnetic disk. According to the conventional dipping techniques, the liquid lubricant could be scattered by the sliding motion of the head on the magnetic disk, and also the lubricating performance could be varied greatly under a high-temperature or low-temperature condition. This is atributable to the fact that the lubricant molecules are adsorbed physically on the protective film surface and no chemical bond exists at the interface between the lubricant molecules and the protective film.

Also, the lubricant concentration or the state of protective film surface would exert a delicate influence on the lubricant build-up in the step of coating of the lubricant, making it difficult to control the thickness of the lubricant film. There also was a possibility that the liquid lubricant or the solvent be contaminated with impurities in the coating step.

Further, because of being liquid, the lubricant could gather around the head while it stayed stationary, letting the head and the magnetic-disk stick to each other to cause improper operation.

Various attempts have been made for overcoming these problems of lubricant. For instance, in Japanese Patent Application Kokai (Laid-Open) No. 61-155345, it has been proposed to apply, on the protective film, a lubricant, such as perfluoropolyether, which contains a terminal group having an anchoring function.

Said lubricant of the prior art (proposed in JPN Pat. Appln. Kokai No. 61-155345) exhibits an excellent adhesive performance when applied directly on a metal surface. However, when applied on a protective film made of amorphous carbon or a non-metallic compound such as silicon oxide, said lubricant can not bring its anchoring function into full play, resulting in a reduced adhesive performance. This can be accounted for by the fact that because of low reactivity between the terminal group of said lubricant and a non-metallic compound, there is hardly produced a solid chemical bond.

Further, it was difficult to work the lubricant molecular layer into a uniform thin film because of weak adhesive force of said molecular layer, so that said lubricant could not be applied to a magnetic disk with high recording density which disk is turned with its surface kept in contact with the head.

SUMMARY OF THE INVENTION

The present invention has for its object to provide a recording medium with which it is possible to improve adhesiveness of the lubricant molecular layer to a magnetic disk, to improve lubricity (sliding endurance) and durability by preventing destructing of the lubricative layer and to realize thinning of the layers formed on the recording medium surface.

It is further envisaged in this invention to provide a recording medium having the following specific characteristics. That is, it is intended in this invention to provide, in an embodiment thereof, a recording medium highly resistant to variations of the environment where a recording device incorporated with the recording medium is located, that is, change of temperature, change of humidity, change of atmospheric pressure, chemical substances floating in the air, etc., and also having excellent weather and corrosion resistance. It is also envisioned in this invention to provide a recording medium with high durability and reliability, featured by the fact that the films or layers up to the lubricant molecular layer are formed continuously in a chamber shut out from the atmosphere to enhance productivity and eliminate the risk of entrance of impurities such as water or organic matter in between the lubricant molecular layer and the substrate.

As means for attaining said first objective, there is proposed in this invention a recording medium provided with a recording head and having at least a thin film for recording (such as a ferromagnetic thin film) and a protective film formed on the surface of the substrate, characterized by having formed on said protective film a lubricant layer having the lubricant molecules fixed at their terminals to the surface of the protective film through strong chemical bond by means of photo-oxidative polymerization or plasma oxidative polymerization.

As a modification of the above disclosure, there is also proposed a recording medium in which the surface of the protective film was oxidized and, in the lubricant molecular layer, the density of molecular terminals fixed to the surface of said protective film was increased by photo-oxidative polymerization or plasma oxidative polymerization.

As means for attaining the second objective, the present invention proposes a recording medium having a lubricant molecular layer in which the molecular terminals are fixed to the surface of the protective film and which is chemically stable and has no risk of being contaminated with water or organic matter.

As a modification thereof, there is proposed a recording medium in which a metal or a metallic compound is dispersed in the surface of the protective film in such a small amount that the protective film is not completely covered with said metal or metallic compound, and on said protective film surface is formed a lubricant molecular layer having the lubricant molecules fixed strongly at their terminals to the metal or metallic compound in the surface of the protective film by oxidative polymerization.

As means for attaining the third objective, this invention proposes a recording medium characterized in that said recording medium and said protective film are formed on the substrate in the in-line vacuum chambers connected by a gate valve, and further a lubricant molecular layer having the lubricant molecules fixed at their terminals to the surface of the protective film is formed by the polymerization in a photo-oxidative polymerization kettle or a plasma oxidative polymerization chamber connected to said chambers through a sluice valve.

BRIEF DESCRIPTION OF THE DRAWINGS

FIGS. 1 to 3 are schematic sectional views of the different embodiments of the present invention.

Reference numerals in the drawings designate the following:

1: substrate 2: chrome undercoat 3: magnetic thin film 4: protective film 5: lubricative layer formed with the molecules fixed at the terminals to the protective film 6: a trace amount of a metal or a metallic compound.

DETAILED DESCRIPTION OF THE INVENTION

The substrate of the recording medium is made of aluminum, glass, graphite or like material. The aluminum substrate may be plated on its surface with nickel phosphide or like substance. Shallow concentric circular grooves may be formed on the substrate by pressing the diamond abrasive grains or an abrasive tape against the turning substrate, so as to improve the head flying characteristics or control the magnetic anisotropy. In the case of glass substrate, fine unevenness may be provided on its surface by etching with a chemical substance such as a strong acid, so as to reduce the area contacting the head to thereby decrease the friction during the sliding motion.

On the substrate of the recording medium, before forming a recording film, chromium or like substance may be deposited by sputtering or other means to form an undercoat for bettering the magnetic characteristics of the recording film.

As the material of the magnetic recording film on the substrate, there can be used, for instance, cobalt-nickel, cobalt-chrome or cobalt-chrome mixed with a small amount of platinum, tantalum, vanadium, samarium or like element.

As the protective film on the substrate, there can be used, for instance, a film made of amorphous carbon. Various methods are available for forming this protective film of amorphous carbon. Such methods include sputtering in an inert gas or a mixture of an inert gas and a hydrocarbon such as methane using graphite as target; plasma CVD using a hydrocarbon gas, an alcohol or an organic compound such as acetone either singly or in admixture with hydrogen gas or an inert gas; and a method in which an organic compound is ionized, accelerated by applying a voltage and run against the substrate.

Also, in place of the amorphous carbon film, there can be used a cubic system boron nitride (c-BN) film formed by plasma CVD method using boron hydride, ammonia and hydrogen as starting materials.

It is further possible to use an yttria-stabilized zirconium oxide film or a silicon oxide film as said protective film.

A perfluoropolyether consisting of carbon, fluorine and oxygen is used for the lubricant molecules which are fixed at the terminals to the surface of the protective film by an oxidative polymerization. The perfluoropolyether used here is of a main chain structure having a segment group such as $(-CF(CF_3)CF_2O-)_n$, $(-CF_2CF_2CF_2O-)_n$, $(-CF(CF_3)CF(CF_3)O-)_n$, $(-CF(CF_3)O-)_n$, $(-CF_2O-)_n$ and $(-CF_2CF_2O-)_n$.

For forming the lubricant molecular layer having the lubricant molecules fixed at the terminals to the protective film surface by oxidative polymerization, there can be used, for instance, a method in which hexafluoropropene and oxygen are introduced into a chamber as starting gaseous material and irradiated with an ultraviolet lamp with high light intensity such as low-pressure mercury lamp to cause photo-oxidative polymerization. As the starting gas, it is recommended to use a mixed gas of oxygen and a carbon fluoride compound having one or more of double bonds. Typical examples of the carbon fluoride compounds having one or more of double bonds usable for said purpose in this invention are hexafluoropropene, 1,3-hexafluorobutadiene, perfluoro-2-butene and tetrafluoroethylene. Use of these carbon fluoride compounds with a carbon number of 4 or less allows pertinent incorporation of ether linkage and reduces branching, enabling obtainment of a lubricant film with excellent lubricating performance. It is to be noted that if a carbon fluoride compound with a carbon number of 5 or greater is used, there is formed a head film with a relatively high carbon content as compared with oxygen. Such a film is unsuited for use as a lubricant film in view of sliding characteristics of recording media.

As the light source for photo-oxidative polymerization, in place of said ultraviolet lamp, one may use laser having high light intensity per unit area and also having excellent monochromaticity and coherence such as the third harmonic of a Nd: YAG laser or an excimer laser. Photo-oxidative polymerization may be induced by turning the substrate. When the starting gas is introduced into the polymerization chamber, said gas may be condensed on the surface of the protective film by cooling the substrate, causing the polymerization reaction to take place on the protective film surface alone and inhibiting formation of the lubricant molecules whose terminals are not fixed to the protective film surface to thereby increase the polymerization reaction efficiency. In case this polymerization reaction is performed in a chamber under close to atmospheric pressure, said starting gas is dissolved in a solvent and the formed solution is applied on the surface of the protective film and then irradiated with ultraviolet light to induce photo-oxidative polymerization.

In case of using a light source with excellent coherence such as laser light for inducing photo-oxidative polymerization, it is possible to freely control molecular orientation of the lubricant molecular layer or distribution of the molecules in the surface of the protective film by controlling the polarization characteristics of the light source on the surface of the protective film.

Among other methods for forming the lubricant molecular layer is a method in which a substrate which has gone through film formation up to the protective film is placed in a vacuum chamber, then the starting gas and an inert gas are introduced into said chamber and plasma polymerization reaction is caused to take place on the surface of the protective film by means of RF or DC discharge.

Before forming the lubricant molecular layer in which the molecular terminals are fixed to the protective film surface, the surface of the protective film may be oxidized by a suitable treatment such as oxygen etching or irradiation with ultraviolet light while passing oxygen on the surface, thereby to increase oxygen concentration in the film surface to enhance efficiency of oxidative polymerization. This enables increase of density of the molecular terminals fixed to the surface of the protective film.

In sum, according to the present invention, for attaining the first objective, a lubricant molecular layer having the lubricant molecules fixed at their terminals to the protective film surface is formed on the protective film provided for protecting the thin film for recording (e.g., ferromagnetic thin film) on the substrate. In said lubricant molecular layer, since polymerization is induced and let progress by radical reactions on the protective film surface, the lubricant molecular terminals are fixed to a very thin oxide film on said protective film surface. Thus, the lubricant molecules are fixed to the protective film by strong chemical bond, so that the lubricant is prevented from being scattered or from flowing to an excessive degree. Consequently, it becomes possible to maintain sliding durability of the recording medium against the head for a long time and to prevent occurrence of a situation where the recording medium sticks to the head through the lubricant when the system is inoperative.

For attaining the second objective, said lubricant molecular layer is fixed to the surface of the protective film by chemical bond to improve adhesiveness and anti-scatter characteristics of said lubricant molecular layer, which leads to an improvement of corrosion resistance of the magnetic medium. The protective film is usually pervious to water, but since the lubricant molecular layer with good adhesiveness and impervious to water is present on said protective film, penetration of water into the recording medium is prevented and also lubricity is kept unaffected, so that it is possible to prevent the protective film, etc., from incurring damage and the thin film for recording from being exposed to the outer air. These actions combine to ensure corrosion resistance of the recording medium.

For attaining the third objective, said thin film for recording, protective film and lubricant molecular layer are formed continuously in the in-line modular chambers connected by gate valves, thereby phenomenally enhancing productivity of the recording medium. Also, since film formation is carried out in the continuous chambers without exposing the recording medium to the atmosphere, there is no risk of causing entrance of impurities such as water and organic matter in between the protective film and the lubricant molecular layer in the lubricant film forming step, thus eliminating any possibility of fall-off or chemical decomposition of the lubricative layer by the impurities and thereby improving durability and reliability of the recording medium.

DESCRIPTION OF PREFERRED EMBODIMENTS

The present invention will be further described below by showing the examples thereof with reference to the accompanying drawings. In the Examples described below, the recording medium is embodied as a magnetic disk.

EXAMPLE 1

FIG. 1 is a schematic sectional view of a magnetic disk in accordance with the first embodiment of the present invention.

In the drawing, numeral 1 designates a disk substrate (for instance a 5.25-inch disk) made of nickel phosphide plated aluminum. On said disk substrate 1 are formed a 0.5 μm thick chrome prime coat 2, a 0.05 μm thick cobalt-nickel magnetic film 3 and a 0.05 μm thick amorphous carbon film 4 successively in that order by sputtering. On the amorphous carbon film 4 is formed a lubricative layer 5 comprising the lubricant molecules which are fixed at their terminals to the surface of the protective film.

The lubricative layer 5 is formed in the following way. The substrate 1 on which said films 1-3 have been formed in the manner described above is placed in an evacuated photo-oxidative polymerization chamber. Then a gas composed of hexafluoropropene and oxygen mixed in a molar ratio of 1:1 is introduced into said chamber until a pressure of 100 mTorr. The substrate 1 is cooled to $-20°$ C. and its surface is irradiated with ultraviolet light from a low-pressure mercury lamp (200 W) for one minute. Then, with the chamber evacuated, the substrate is returned to room temperature, and the by-product low-molecular weight carbon fluoride compound is removed from the substrate.

Proper formation of the lubricative layer 5 having the molecules fixed at the terminals to the surface of the protective film was confirmed by mass spectrometry, FT-IR high sensitive reflection method and ESCA. It was confirmed by mass spectrometry that the elemental ratio of the lubricative layer 5 agreed with that of $(-C_3F_6O-)_n$. In analysis of the magnetic disk surface by FT-IR high sensitive reflection method, there was observed a peak assigned to the C-F bond stretching vibration mode at 1,250 cm$^{-1}$. A magnetic disk was made by forming the films 2-4 on the substrate in the manner described above and dipping the same in a solution formed by dissolving a commercial lubricant with an average molecular weight of 3,000 represented by the chemical formula $CF_3O(-(CF_3)CFCF_2O-)_nCF_3$ in a fluorocarbon solvent (this magnetic disk being hereinafter referred to as lubricated reference disk). The high sensitive reflection spectrum of this magnetic disk was identical with that of the magnetic disk obtained in the instant Example of the present invention. ESCA confirmed that oxygen and fluorine were bonded to carbon in the surface of the magnetic disk of the instant Example of the invention.

That the molecules in the lubricant molecular layer were strongly fixed at the terminals to the surface of the protective film was ascertained by the following experiment. The magnetic disk according to the instant Example of this invention and the lubricated reference disk were dipped simultaneously in a fluorocarbon solvent and subjected to ultrasonic cleaning for 5 minutes, and after cleaning, absorbance of the C-F bond stretching vibration mode was measured by the high sensitive reflection method. In the case of the lubricated reference disk, there was observed no sign of C-F bond stretching vibration mode after cleaning, due to perfect elimination of the lubricant molecules. On the other hand, in the case of the magnetic disk according to this invention, there was seen no decrease of absorbance of the C-F bond stretching vibration mode, which confirmed that in this magnetic disk the molecules in the lubricative layer are strongly bonded at the terminals to the surface of the protective film.

For evaluating the service life of the magnetic disk of the instant Example of this invention, it was subjected to a contract-start-stop test (CSS test in which a disk to be tested is turned in contact with a testing heat made with the same material and the same configuration as the actual head, and the disk is stopped after lifting up the head. This run of operations is repeated cyclically at constant intervals). As a result, no trace of damage was seen on the disk surface even after hundreds of thousands of cycles of said run of operations.

When the same CSS test was conducted on the lubricated reference disk, the disk surface was damaged after 30,000 cycles.

It was confirmed from the above comparison that the magnetic disk of the instant Example of this invention excelled the conventional lubricated reference disk in adhesiveness (retention) of the lubricant and in prevention of scattering of the lubricant.

The dynamic coefficient of friction of these magnetic disks was determined by using a manganese-zinc-ferrite head. The head was turned at a speed of 1 r.p.m. under a load of 10 gf, and the force exerted to the head was measured by a strain gauge to determine the dynamic coefficient of friction. As a result, the lubricated reference disk showed a dynamic coefficient of friction of 0.33, as compared with 0.27 of the magnetic disk of the instant Example of this invention, which demonstrates an improvement of sliding characteristics of the magnetic disk according to this invention. When the dynamic coefficient of friction on the sliding track was determined after 20,000 cycles of run in the CSS test, it rose to 0.75 in the lubricated reference disk whereas it was 0.35 in the magnetic disk according to the instant Example of this invention. This confirmed that the rise of dynamic coefficient of friction in repetition of CSS operations was suppressed by the improvement of anti-scatter characteristics.

Further, when the magnetic disk of the instant Example and the lubricated reference disk were subjected to a test of leaving the disk in a constant temperature (80° C.) and constant humidity (90% RH) environment for 72 hours, the lubricated reference disk had 5 corroded spots whereas the magnetic disk of the instant Example had no corroded spot.

When the contact angles of pure water on the surface of the magnetic disk of the instant Example and the lubricanted reference disk was measured, the lubricated reference disk showed the contact angle of 95° whereas the magnetic disk of the instant Example showed the contact angle of 110°, indicating that it had the same hydrophobic feature as the surface of polytetrafluoroethylene.

When said both disks were subjected to a test of dispersion-in-water of lubricant by immersing the disk in pure water, conducting ultrasonic cleaning for one minute and then quantifying the lubricant by FT-IR, the lubricant vanished completely after cleaning in the lubricated reference disk whereas no decrease of lubricant was seen in the magnetic disk of the instant Example, indicating high weather resistance of this magnetic disk.

EXAMPLE 2

FIG. 2 is a schematic sectional view of a magnetic disk in accordance with the second embodiment of this invention.

The disk substrate 1 (for instance a 3.5 inch disk) is made of reinforced glass. On the substrate 1 are formed a 0.4 μm thick chrome prime coat 2 and a 0.04 μm thick cobalt-chrome-platinum magnetic film 3 by sputtering, and thereon is formed a 0.01 μm thick amorphous carbon film 4 by plasma CVD using methane as starting material.

The disk substrate having said laminated films formed thereon was led into a surface polymerization chamber connected to a sequential film forming device through a gate valve. Then a 1:0.7 mixture (by molar ratio) of hexafluoropropane and oxygen was introduced into said chamber until a pressure of 70 mTorr, and the disk substrate was cooled to −30° C. Thereafter, the disk substrate was turned at 30 r.p.m. and a nitrogen laser light (337 nm) loosely condensed by a quartz lens was applied to the surface of the protective film. The laser light irradiation position was moved slowly in the radial direction to form a lubricative layer 5 in which the molecules were oriented to have a concentric circular distribution with their terminals fixed to the surface of the protective film.

The concentric circular distribution of the molecules in the lubricant molecular layer was confirmed by microscopic FT-IR.

By FT-IR high sensitive reflection method, ESCA and mass spectrometry, it was confirmed that the lubricative layer in the present embodiment of the invention had a chemical structure identical with that in Example 1.

10-minute ultrasonic cleaning in a fluorocarbon solvent conducted in the same way as in Example 1 caused no loss of the lubricative layer.

The dynamic coefficient of friction of the obtained magnetic disk, determined in the same way as in Example 1, was 0.19. It was confirmed that the unevenness of the surface of the lubricative layer caused a reduction of the area of contact with the head, and this led to a decrease of friction coefficient. The dynamic coefficient of friction of the sliding track measured after 20,000 runs of operations in the same CSS test as conducted in Example 1 was 0.29.

Also, no sign of damage on the disk surface was seen even after repetitive 150,000 runs of operations in the CSS test.

EXAMPLE 3

In this Example, although no illustration is given in the accompanying drawings, a magnetic disk having formed thereon the films 2-4 in the same way as Example 1 was subjected to oxygen etching by a high-frequency plasma etching device connected to a sequential sputter film forming apparatus through a gate valve. The etching conditions were as follows: oxygen gas pressure =50 mTorr; power =0.3 W/cm$^2$; etching rate =1-2 nm. Then the magnetic disk was led into an RF Plasma polymerization chamber connected to said etching device through a gate valve, and a 50:1:1 mixture (by molar ratio) of argon, hexafluoropropene and oxygen with a total pressure of 1 Torr was flown through said chamber at a rate of 20 cc/min. Further, the magnetic disk was subjected to 2-minute RF discharge at a discharge frequency of 13.56 MHz with a discharge power of 10 W to cause plasma polymerization on the surface of the protective film.

That a lubricative layer having the molecules fixed at their terminals to the surface of the protective film was formed on the magnetic disk was confirmed by FT-IR high sensitive reflection method, ESCA and mass spectrometry as in Example 1.

In a test of scattering characteristic of the lubricant in water conducted in the same way as in Example 1, there was observed no decrease of the lubricant even after three minutes of ultrasonic cleaning in water, and it was confirmed that the presence of a metal, in a dispersed state, between the protective film and the lubricative layer has increased the bonding strength of the terminals of the lubricant molecules to the surface of the protective film.

Further, in the CSS test, the disk surface remained free of damage even after repetitive 160,000 runs of operations.

EXAMPLE 4

FIG. 3 is a schematic sectional view of a magnetic disk according to the fourth embodiment of this invention.

In this embodiment, the substrate 1 and the films 2–4 are the same as those of Example 1, but a slight amount of a metal or a metallic compound is dispersed between the protective film 4 and the lubricative layer 5 to such a degree that the protective film won't be covered completely. More specifically, a slight amount (15 atom % as determined by Auger analysis) of aluminum 6 was deposited on the protective film by sputtering.

Then, as in Example 1, a lubricative layer 5 was formed on the protective film by photo-oxidative polymerization of hexafluoropropene.

Confirmation of the lubricative layer was made by FT-IR high sensitive reflection method, ESCA and mass spectrometry as in Example 1.

No decrease of the lubricative layer was seen even after 20 minutes of ultrasonic cleaning in a fluorocarbon solvent conducted in the same way as in Example 1.

Also, in the CSS test, the disk surface suffered no damage even after repetitive 160,000 CSS cycles.

As described above, according to the means of this invention for attaining the first objective, it is possible to realize excellent lubricant retaining characteristics and corrosion resistance by forming a lubricative layer having the molecules fixed at the terminals to the surface of a protective film on a substrate. This makes it possible to provide a recording medium showing stabilized sliding durability under all possible environmental conditions of use and having long service life and high reliability. Also, in the recording medium according to the present invention, the lubricative layer can be reduced in thickness as compared with the recording media having a conventional liquid lubricant coating. Consequently, the space between the head and the recording medium can be reduced correspondingly to enable high-density recording.

According to the means for attaining the second objective, in addition to the above-described effects, there can be achieved a further enhancement of adhesiveness of the lubricative layer to the protective film to provide excellent weather and corrosion resistance.

According to the means for attaining the third objective, there is eliminated any risk of entrance of impurities such as water and organic matter in between the lubricative layer and the protective film to provide a recording medium with excellent durability and reliability.

The lubricative layer forming techniques of the present invention can be applied to the production of not only the magnetic recording media such as magnetic disks, magnetic tapes, magnetic cards, etc., but also the optical disks, photomagnetic disks, etc., in case of using a head having a possibility of contacting the disk in operation.

What is claimed is:

1. A method for producing a recording medium which comprises forming a thin film for recording on at least one side of a substrate, forming a protective layer on the thin film, and further forming a lubricative film on the protective layer by subjecting a starting gas to oxidative polymerization with oxygen gas wherein the starting gas comprises a carbon fluoride with a carbon number of 4 or less having one or more double bonds, the oxidative polymerization is effected by light irradiation with an ultraviolet lamp or a laser light source and an elemental ratio of carbon:fluorine:oxygen in the lubricative film is 3:6:1.

2. A method for producing a recording medium which comprises forming a thin film for recording on at least one side of a non-magnetic substrate, and further forming on the thin recording film a lubricative film by subjecting a starting gas to oxidative polymerization with oxygen gas wherein the starting gas comprises a carbon fluoride with a carbon number of 4 or less having one or more double bonds, the oxidative polymerization is effected by light irradiation with an ultraviolet lamp or a laser light source and an elemental ratio of carbon:fluorine:oxygen in the lubricative film is 3:6:1.

3. A method according to claim 1, wherein the oxidative polymerization is controlled by cooling the substrate and having the starting gas adsorbed thereon.

4. A method according to claim 1, wherein after formation of the protective layer, the surface of the protective layer is oxidized by means of oxygen etching or irradiation with ultraviolet light while passing oxygen on the surface of the protective layer.

5. A method according to claim 4, wherein the protective layer is made of amorphous carbon, silicon carbide, zirconium oxide or cubic boron nitride.

6. A method according to claim 1, wherein after formation of the protective layer, a metal or a metallic compound is dispersed on the surface of said protective layer.

7. A method according to claim 1, wherein the oxidative polymerization is effected in a evacuated chamber.

8. A method according to claim 1, wherein the lubricative film is directly formed on the protective layer in a chamber at reduced pressure less than the atmosphere.

9. A method according to claim 1, wherein the lubricative film is formed by polymerizing gas molecules of hexafluoropropene and oxygen on the surface of the protective layer in an evacuated photo-oxidative polymerization chamber.

10. A method according to claim 1, wherein the surface of the protective layer is subjected to oxygen etching prior to the formation of the lubricative film.

11. A method according to claim 1, wherein the starting gas comprises hexafluoropropene.

* * * * *